July 15, 1947.　　　J. B. PERKINS　　　2,423,901

DEFERRED ACTION PRIMARY DRY CELL

Filed Oct. 25, 1944

*INVENTOR.*
JOHN B. PERKINS

BY William D. Hall
*Attorney*

Patented July 15, 1947

2,423,901

UNITED STATES PATENT OFFICE 2,423,901

DEFERRED ACTION PRIMARY DRY CELL

John B. Perkins, Red Bank, N. J.

Application October 25, 1944, Serial No. 560,297

3 Claims. (Cl. 136—113)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to primary cells, and particularly to cells of the deferred-action type.

Electrical dry cells are commercially manufactured as completely assembled units and include the active as well as the inactive ingredients of the electrolytic mix. Hence they deteriorate on the "shelf" even before being put into actual use. It is, therefore, an object of the present invention to provide a dry cell, and a battery of such cells, which are not electrically activated until they are to be used and which will, therefore, not suffer any deterioration during transportation or storage, but which may be easily and rapidly activated when needed for use.

It is a further object to provide a single dry cell, and a battery of dry cells, as completely assembled units, except for the activating electrolyte, so that the assembling of the parts thereof, other than merely introducing said activating electrolyte, will not be necessary at the time of use.

It is another object of this invention to design a dry cell, and a multiple cell battery thereof, which will be particularly well adapted to scientific and military usage, wherein they may be transported for great distances, stored for long periods of time and subjected to variations in temperature, in that they will require little servicing to activate them and they will be "fresh" when put into use.

It is also an object to provide a type of construction for such an activatable cell or battery as will be adapted for very small cells known as "miniatures."

It is still another object to provide a deferred-action type primary cell where the same sealing means may be used, both before and after activation, for the aperture in the cell through which the activating electrolyte is introduced for activation of said cell.

A further object is to provide means to facilitate the withdrawal of the seal at the time of activation.

Some types of deferred-action cells (such as described in an application for United States Letters Patent by Samuel Sussman, filed on November 12, 1943, and bearing Serial No. 509,998) comprise a cup of zinc telescoped within a tube of zinc. The cup acts exclusively, or almost exclusively, as the negative element of the cell. Such construction uses more zinc than necessary for the negative element and also, due to the two cylinders, results in cells which have a lesser amount of inside space and a greater weight than "standard" cells of the same outside dimensions. It is, therefore, an object of the present invention to provide cells, and batteries thereof, which use considerably less zinc, which at the present time is a critical metal, thereby cutting down the amount of metal used, the cost and the weight and at the same time resulting in what amounts to larger cells within the same outside dimensions, thus allowing larger deferred-action type cells to be made in "standard" sizes than other deferred-action type cells of the prior art.

In deferred-action type cells it is advisable to provide some form of separator or shield to protect the zinc from chemical attack by the ingredients of the bobbin prior to the time the cell is activated. Thus, in the pending application of Samuel Sussman, aforementioned, a paper wrapper is placed about the bobbin, to be removed and discarded at the time of activation. It is, therefore, an object of the present invention to provide an improved separator or shield which may be removed and discarded upon activation.

It is also an object to provide a deferred-action type cell which may be made almost entirely of standard or conventional cell elements, thus simplifying manufacture and cutting down the cost thereof.

In some deferred-action type cells activation is made difficult or impossible because of changes which take place between the time of manufacture and the time of activation. For instance, in constructions where a cup telescopes into a tube, the cup may be pushed too far into the tube so as to leave an insufficient portion of the cup available for gripping. Also, the cup and tube may become stuck to each other or corroded, as where both are of zinc, so as to make it difficult to separate them. Hence, one object herein is to provide a construction wherein the separating of the parts necessary to effect activation is facilitated.

To the accomplishment of the foregoing objects and such other objects as will become clear hereinafter the present invention consists of an electrical cell which, in a preferred form, may include a conventional carbon rod, brass cap, bobbin of depolarizer mix and wax seal. The negative element may be a zinc tube, open at one end. A plastic cup member is provided which is adapted to telescope into the said zinc tube so as to surround the bobbin and shield the tube therefrom and to seal up the open end of the zinc tube. The plastic cup member may have stop means to keep it from penetrating too far up into the tube. It also preferably has some retracting means, such as a loop, on its end to allow it to be readily withdrawn from the tube. The cup member is also notched about its circumference a short distance beyond the stop means so that, when the cell is activated, the plastic material may be broken along the notch so as to separate the cap member into a tubular portion and a cup portion. The tubular portion may then be discarded, having served its purpose of shielding the zinc tube from the depolarizer mix. Only the cup portion is retained and reinserted into the tube after a proper application of activating electrolyte.

To better understand the present invention a preferred embodiment of a single cell is shown in the appended drawings, wherein Figure 1 is a longitudinal cross section of the cell constructed according to said invention, the cell being shown in its inactivated state;

Figure 1:
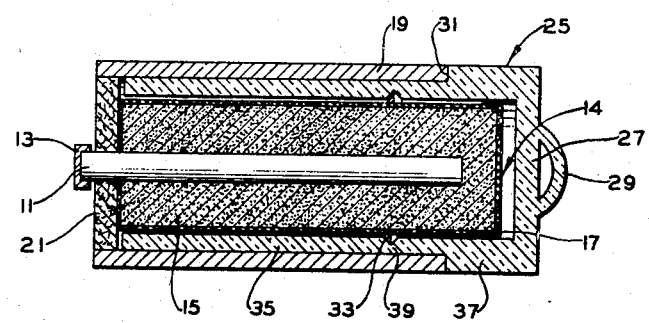
Figure 2:
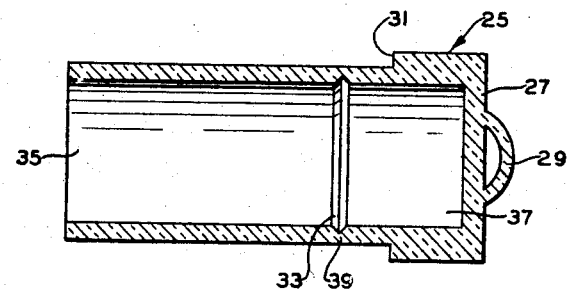
Figure 2 is a similar view of the plastic cup member removed from the cell.
Figure 3:
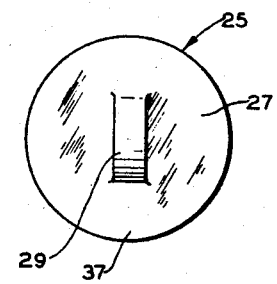
Figure 3 is a right end elevational view of Figure 2.

The cell shown in the drawings has, as its positive electrode, a conventional carbon rod 11, to one end of which is affixed a conventional brass contact cap 13. Secured about said rod 11 is a conventional bobbin 14 of inactive depolarizer mix 15 encased in a cylindrical bag of cheese cloth 17 held in place by several strands of thread 18. The carbon rod 11 and bobbin 14 are concentrically disposed within a zinc tube 19. A space 23 is left between the inner surface of the tube 19 and outer surface of the bobbin 14 to accommodate the cup member 25 hereinafter described. The rod 11 is retained in its concentric position aforesaid by a conventional disc of sealing material 21, such as battery wax.

The cup member 25 is preferably of a plastic material having some flexibility and has the configuration of a cylinder closed at one end 27 and open at the other. Affixed to the said end 27 is a loop 29. The plastic material of the cylinder is of greater thickness for part of its length about the closed end 27 so as to form an external peripheral shoulder 31 facing toward the open end. A short distance beyond said shoulder 31, and about the inside of the cylinder is a notch 33 which separates the cup member 25 into a tubular shield 35 and a cup 37 which are connected by an annulus of thin plastic material 39. The cell may be activated by the introduction of an activating electrolyte 41, preferably in paste form, as will be hereinafter described. It will be understood that any suitable inactive depolarizer mix 15 and any suitable activating electrolyte 41 may be used. For instance, a representative depolarizer mix 15 would be as follows:

|  | Per cent |
|---|---|
| Manganese dioxide ore | 64.1 |
| Carbon black | 6.4 |
| Ammonium chloride | 13.2 |
| Zinc chloride | 4.4 |
| Water | 11.9 | and a representative activating electrolyte 41 would be as follows:

|  | Per cent |
|---|---|
| Starch | 10.9 |
| Flour | 3.7 |
| Ammonium chloride | 20.3 |
| Zinc chloride | 19.0 |
| Mercuric chloride | 0.1 |
| Water | 46. |

The cell just described in its inactive state (as shown in Figure 1) may be stored indefinitely without depreciation of any of its components. It may be activated at any time whereupon it will be immediately ready for use.

To activate said cell the cup member 25 is withdrawn from the tube 19 by grasping the cup member about its thickened end portion, which is intentionally of heavier construction for that purpose, or by grasping the loop 29. If withdrawal is impeded by a tight fit of the cup member 25 within the tube 19, a screw driver or other handy implement may be inserted through said loop 29 to facilitate withdrawal.

Figure 4:
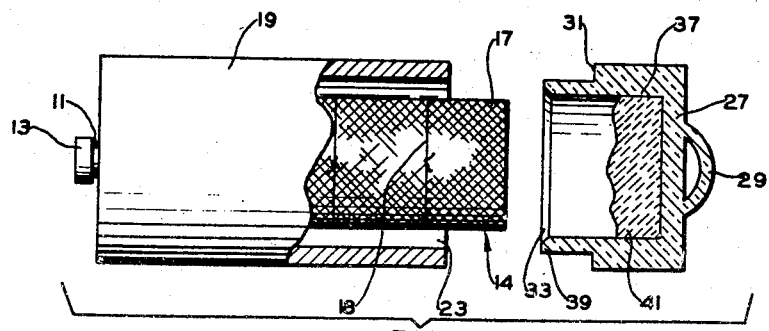
Figure 4 is an elevation, partly sectioned, of said cell in the process of being activated.

The tubular shield 35 may then be separated from the cup 37 by breaking the thin plastic material 39 along the notch 33 and the said shield, having served its purpose, is discarded. A suitable quantity of activating electrolyte 41 is placed within said cup 37 (as shown in Figure 4) and the cup is thereupon replaced, the activating electrolyte being thereby forced into and about the bobbin 14 of depolarizer mix 15. The cell is ready for use instantly and will thereupon have the same useful life as if it had been activated when first manufactured and put into immediate use.

The plastic shield 35 serves the double purpose of protecting the zinc tube 19 against possible chemical attack by the ingredients of the depolarizer mix 15 and also of supporting the bobbin 14 in its concentric position during transportation and storage. The flexibility of the material of the cup 37 allows it to conform to minor irregularities in the zinc tube 19 so as to make a good seal with said tube both before and after activation. Before activation such seal is important to keep the depolarizer mix in good condition, and after activation to prevent leakage of the activating electrolyte. The shoulder 31 about the cup member 25 keeps the cup 37 from penetrating too far into the tube 19, both before and after activation.

Cells made according to the present invention may be used as individual cells or may be made up into multiple cell batteries as desired. While there has been described what is at present considered a preferred embodiment of the invention, it will be obvious to those skilled in the art that various changes and modifications may be made therein without departing from the invention and it is, therefore, aimed in the appended claims to cover such changes and modifications as may be made within the true spirit and scope of the invention.

What is claimed is:

1. A deferred-action type cell comprising a positive electrode, an inactive depolarizer mix surrounding said positive electrode; a substantially tubular negative electrode surrounding and spaced from said mix; an opening in one end of said negative electrode; a sealing member including a substantially cup-shaped closure adapted to seal the opening in said negative electrode and a substantially tubular shield adapted to slidably fit between the depolarizer mix and the negative electrode, said closure and shield being joined for ready separation, so that the shield may be separated from the closure and discarded upon activation of the cell.

2. In a deferred-action type cell of the class having an elongated central electrode surrounded by a bobbin of depolarizer mix which in turn is surrounded by a tubular electrode spaced from said mix, said tubular electrode having an opening at one end, which cell may be activated by introducing activating electrolyte through said opening; the combination of a sealing cup adapted to seal said opening, both before and after activation; a tubular shield adapted to fit between said mix and said tubular electrode; joining means to connect said cup and shield which means may be readily broken to separate the cup from the shield.

3. An electrical dry cell comprising an activating electrolyte; and, separate therefrom, a tubular negative element, a concentrically disposed rod-like positive element, means sealing one end of said tubular element and sustaining said rod-like element in its concentric position, a bobbin of depolarizer mix concentrically disposed about said rod-like element and within the tubular element and spaced from said tubular element, a cup like shell of nonconducting material, said shell being notched about its circumference so as to form a cup portion and a tubular portion readily separable from each other at said notch, said shell being telescopable into the unsealed end of the tubular element aforesaid so as to fit between said tubular element and said bobbin, said cell being electrically activatable upon the withdrawal of the shell, the separation therefrom of the tubular portion thereof, the placing in the cup portion thereof of the activating electrolyte aforesaid and the retelescoping of said cup portion into said tubular element.

JOHN B. PERKINS.

REFERENCES CITED

The following references are of record in the file of this patent:

UNITED STATES PATENTS

| Number | Name | Date |
| --- | --- | --- |
| 541,350 | Glasgow | June 18, 1895 |
| 2,218,197 | Hall | Oct. 15, 1940 |
| 515,432 | Hubbell | Feb. 27, 1894 |
| 1,587,356 | Riebeth | June 1, 1926 |

FOREIGN PATENTS

| Number | Country | Date |
| --- | --- | --- |
| 139,265 | Great Britain | Mar. 4, 1920 |